May 27, 1941.  H. E. ARNOLD  2,243,076
APPARATUS FOR HARDENING GEARS
Filed Sept. 26, 1939
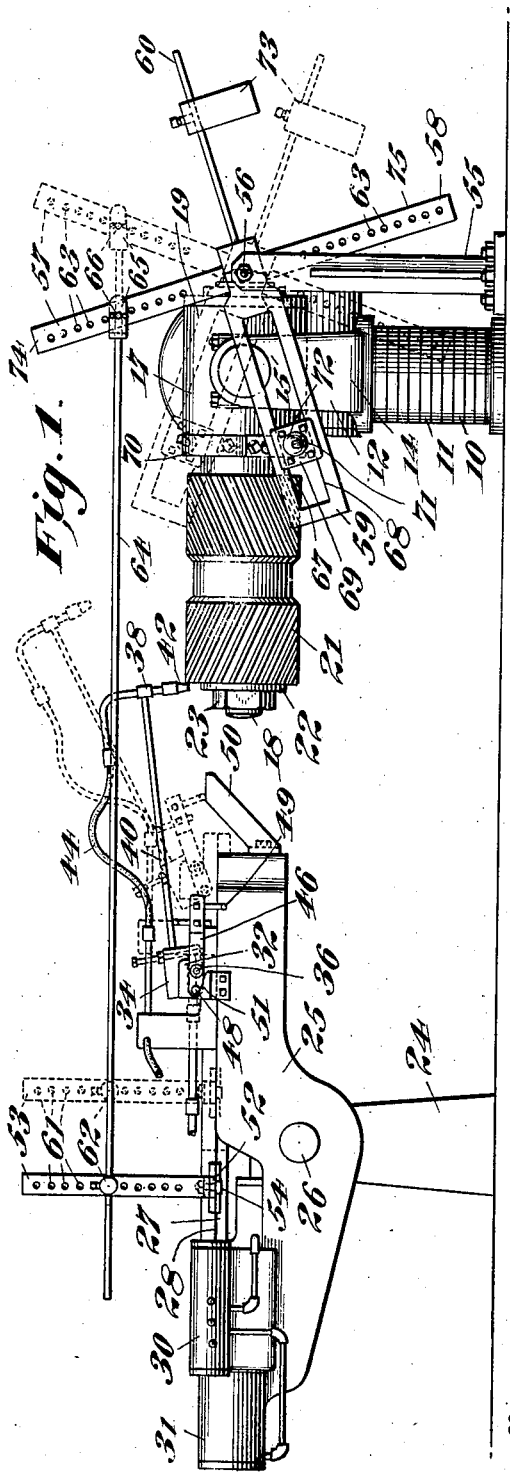
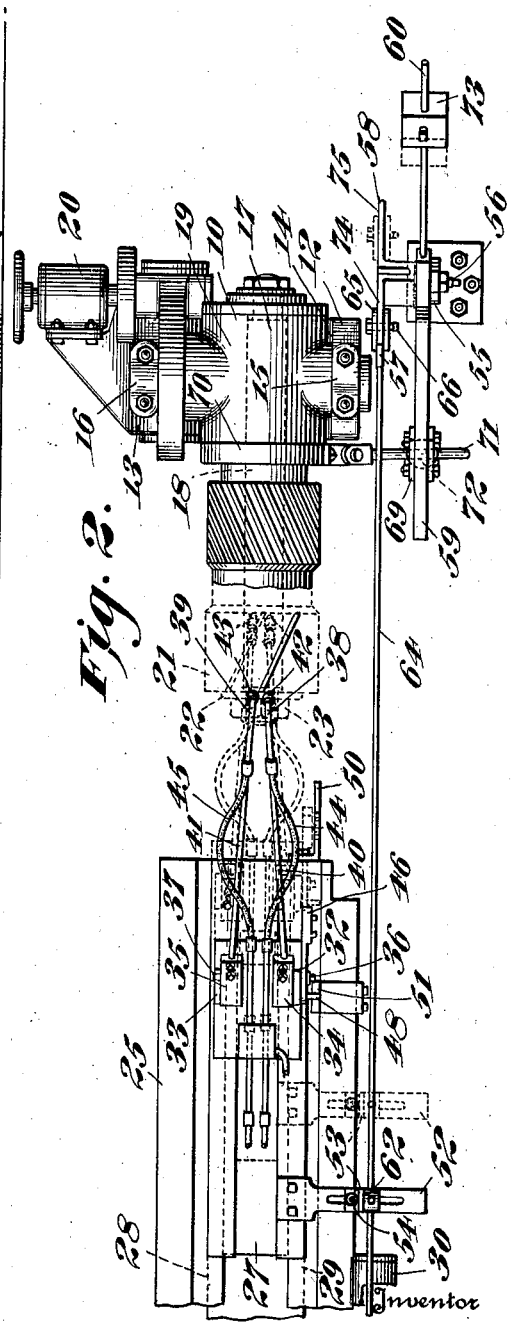
Inventor
*Harry E. Arnold.*
By *R. S. C. Dougherty.*
Attorney Patented May 27, 1941

2,243,076

UNITED STATES PATENT OFFICE 2,243,076

APPARATUS FOR HARDENING GEARS

Harry E. Arnold, Allentown, Pa., assignor to Bethlehem Steel Company, a corporation of Pennsylvania Application September 26, 1939, Serial No. 296,530

4 Claims. (Cl. 266—23)

My invention relates to the surface hardening of metal articles and more particularly to the hardening of metal gears through the use of apparatus in which the surfaces of the gear teeth are progressively rapidly heated by means of an oxy-acetylene flame or the like and are then quenched by water or air. More particularly my invention relates to the hardening, by such apparatus, of helical gears, such as herring bone gears, spiral gears and the like.

It has heretofore been proposed to harden straight toothed spur and bevel gears by fixing such gears in a suitable mounting and by providing flame hardening torches mounted in suitable guideways so that they may be reciprocated longitudinally of the gear tooth. Apparatus for so flame hardening straight gears is shown in Patent No. 2,102,040 to Slade, dated December 14, 1937. The apparatus described in that patent is useful for the hardening of straight toothed spur and bevel gears and pinions but is not adapted for use in the hardening of helical gears since the hardening torches are limited to movement in a single plane parallel with the surface of the gear being hardened, while the teeth of a helical gear follow the curved surface of the gear face.

It is an object of my invention to provide means whereby the tooth of a helical gear being hardened may be maintained in proper registry with the flame hardening torch. It is a further object of my invention to provide means for rotating on its axis the gear to be hardened so that as the torch reciprocates the gear tooth to be hardened will remain properly indexed with respect to the torch. Still another object of my invention is to provide means which will be actuated by the torch as it reciprocates for so rotating the gear to be hardened. Other objects of my invention will be made clear from a consideration of the following detailed description of my invention and from the accompanying drawing, in which Figure 1 is an elevation of an apparatus embodying my invention, and Figure 2 is a plan view of the same.

Referring more particularly to the drawing, 10 represents the means for mounting the gear to be hardened, comprising a pedestal 11 which carries arms 12 and 13 forming a yoke 14. Bearings 15 and 16, located at the upper ends of arms 12 and 13 respectively support the work carrier 17 which comprises the rotatable spindle 18 and mounting 19 therefor. Work carrier 17 is rotatably mounted in the bearings 15 and 16 and may be rotated by means of electric motor 20 operating through suitable gearing (not shown).

The gear being hardened is represented at 21, mounted on the end of the spindle 18 and secured thereto by means of the washer 22 and nut 23.

The apparatus for applying the torch to the gear comprises pedestal 24 to which the bench 25 is pivotally attached at 26. Mounted on the bench 25 is the torch carriage 27 which is capable of being reciprocated longitudinally of the bench between guideways 28 and 29 by means of fluid pressure acting through cylinders 30 and 31. Extending upwardly from the carriage 27 are the ears 32 and 33 to which the torch carrying blocks 34 and 35 are pivoted at 36 and 37 respectively.

As shown in the drawing, two torches 38 and 39 are used, one for each side of a gear tooth. The torches comprise hollow tubes 40 and 41 mounted in blocks 34 and 35 respectively and terminating in burner tips 42 and 43. Oxygen and acetylene are supplied to burner tip 42 through tube 40 and flexible tube 44; and to burner tip 43 through tube 41 and flexible tube 45; in each case from sources not shown.

Secured to the blocks 34 and 35 through pivot 36 is the bar 46 which extends rearwardly of the pivot and is provided with a stud 48, and from the forward end of which depends the arm 49. Extending upwardly from the forward end of the bench 25 is cam bar 50. During the operation of the carriage 27, arm 49 will contact cam bar 50 at the extreme forward movement of the carriage and will thereby raise the torches 38 and 39 above the work so that they may be returned to their initial position out of contact with the work. On the return of the carriage to its initial position stud 48 extending from the rear end of bar 46 will strike the inclined surface of the cam 51 which is secured to bench 25, thereby lowering torches 38 and 39 to their operative position. If desired, the above described apparatus for raising and lowering torches 38 and 39 may be dispensed with, so that the torches will remain in operative relation to the work on both their forward and return strokes.

For the purpose of flame hardening helical gears, the following additional apparatus is employed. Extending outwardly from the carriage 27 is the arm 52 to which the vertical arm 53 is adjustably secured by bolt 54. Arm 53 is provided with a plurality of holes 61 in which the stud 62 may be pivotally mounted. Mounted adjacent the pedestal 11 is the upright support 55. Pivoted on a horizontal axis at 56 through said support are the arms 57, 58, 59 and 60 substantially in the form of a vertically disposed cross.

said arms 57, 58 and 59 forming bell cranks 74 and 75, in which arm 59 is common to both bell cranks, and said arm 60 being equipped with counterweight 73. Arms 57 and 58 are provided with a number of holes 63. Rod 64 connects arms 53 and 57 by means of clevis 65 and bolt 66.

Arm 59 comprises the guideways 67 and 68 in which the crosshead 69 is slidably mounted.

Secured to the work spindle 18 is the ring 70, extending from which in a radial direction is the rod 71 which is slidably connected to the crosshead 69 by the ball joint 72.

In operating the apparatus for the hardening of helical gears, the gear 21 is mounted on spindle 18 and secured thereto by washer 22 and nut 23.

The position of the rod 64 with respect to arms 53 and 57 is adjustable, as hereinbefore noted, and will vary in practice with the helix angle of the gear being treated. In general, the rod 64 will be located near the upper ends of said arms when the helix angle of the gear is small, and near the lower ends thereof when the helix angle is large.

With the rod 64 connecting the arms 53 and 57 it will be seen that a forward motion of the carriage 27 will cause the bell crank 74 to turn on its axis in a clockwise direction. The raising of the bell crank arm 59 will raise lever 71 which, however, being fixed to the ring 70 will cause said ring, and with it the gear 21, to rotate on its axis.

In operating the apparatus the carriage 27 is moved to its rearward position and the torches lowered in proximity with the tooth to be hardened. The nut 23 is loosened so that the gear 21 may be rotated in order to space the sides of the tooth to be hardened equidistant from the torches 42 and 43. The nut 23 is then tightened. The carriage 27 is then moved towards the gear 21 by the mechanism provided therefor. Obviously, if the gear were held stationary the forward movement of the torches would soon be arrested as a result of their striking the helical gear teeth. However by means of the rod 64 acting on the bell crank 74 and through lever 71, the forward movement of the carriage causes a rotation of the gear 21 so that the relative position of the torches and the sides of gear tooth remain unchanged during the forward movement of the torches.

When the torches reach the limit of their forward movement, the action of the cam bar 50 raises the torches 42 and 43 out of operating relationship with the work. The carriage 27 is then returned to its original position. The nut 23 is then loosened and the gear 18 rotated by hand to present a new tooth to the torches, and the cycle is repeated.

The drawing shows the operative relationship of the parts when applied to a gear having a right hand helix. When it is desired to harden a gear having a left hand helix it is only necessary to reverse the position of the 53 on the carriage 27 so that the arm 53 extends downwardly, and to attach the rod 64 to the downwardly projecting arm 58 of the bell crank 75. By so doing the direction of rotation of the gear 21 when the carriage 27 is moved forward will be reversed.

Having thus described my invention what I claim as new and desire to secure by Letters Patent is:

1. Apparatus for flame hardening the teeth of a helical gear comprising an axially rotatable mounting for said gear, a torch for hardening the teeth thereof, a reciprocable carriage for said torch, a bell crank mounted adjacent said gear, an arm pivotally connecting said carriage and one arm of said bell crank and an arm fixed to said rotatable mounting and slidably connected with the second arm of said bell crank.

2. Apparatus for flame hardening a helical gear comprising an axially rotatable mounting for said gear, a torch, a reciprocable carriage for said torch, a bell crank mounted adjacent said gear, an arm pivotally connecting said carriage and one arm of said bell crank and adjustable to and from the axis of said bell crank, and an arm fixed to said rotatable mounting and extending radially therefrom and slidably connected with the second arm of said bell crank.

3. Apparatus for flame hardening the teeth of a helical gear comprising an axially rotatable mounting for said gear, a torch for hardening the teeth thereof, a reciprocable carriage for said torch, a bell crank mounted adjacent said gear on an axis substantially perpendicular to the axis of said gear, an arm pivotally connecting said carriage and one arm of said bell crank and an arm fixed to said rotatable mounting and slidably connected with the second arm of said bell crank.

4. Apparatus for hardening the teeth of a helical gear comprising an axially rotatable mounting for said gear, means for hardening the teeth thereof, a reciprocable carriage for said means, a bell crank mounted adjacent said gear, a connecting arm secured at one end to said carriage and at the other end to one arm of said bell crank, a second connecting arm, securing means between one end of said second connecting arm and said rotatable mounting, and securing means between the other end of said second connecting arm and the second arm of said bell crank, one of said securing means being slidable to permit longitudinal movement of the second connecting arm relative to the element to which it is secured.

HARRY E. ARNOLD.